(12) United States Patent
Tomoda et al.

(10) Patent No.: US 12,162,470 B2
(45) Date of Patent: Dec. 10, 2024

(54) CONTROL METHOD AND CONTROL DEVICE FOR HYBRID VEHICLE

(71) Applicant: NISSAN MOTOR CO., LTD., Yokohama (JP)

(72) Inventors: Koki Tomoda, Kanagawa (JP); Masato Koga, Kanagawa (JP)

(73) Assignee: NISSAN MOTOR CO., LTD., Yokohama (JP)

(*) Notice: Subject to any disclaimer, the term of this patent is extended or adjusted under 35 U.S.C. 154(b) by 0 days.

(21) Appl. No.: 18/282,328

(22) PCT Filed: Mar. 18, 2021

(86) PCT No.: PCT/JP2021/011126
§ 371 (c)(1),
(2) Date: Sep. 15, 2023

(87) PCT Pub. No.: WO2022/195810
PCT Pub. Date: Sep. 22, 2022

(65) Prior Publication Data
US 2024/0157932 A1 May 16, 2024

(51) Int. Cl.
*B60W 20/20* (2016.01)
*B60W 20/40* (2016.01)

(52) U.S. Cl.
CPC ............ *B60W 20/20* (2013.01); *B60W 20/40* (2013.01); *B60W 2710/021* (2013.01)

(58) Field of Classification Search
CPC ................. B60W 20/20; B60W 20/40; B60W 2710/021; B60W 10/08; B60W 10/11
See application file for complete search history.

(56) References Cited

U.S. PATENT DOCUMENTS

| | | | |
|---|---|---|---|
| 7,954,581 B2 * | 6/2011 | Tanishima | B60W 10/115 903/946 |
| 9,346,461 B2 * | 5/2016 | Saito | B60W 10/08 |
| 9,623,867 B2 * | 4/2017 | Ashizawa | B60K 6/48 |

FOREIGN PATENT DOCUMENTS

| | | |
|---|---|---|
| JP | 2009-227268 A | 10/2009 |
| JP | 2017-013752 A | 1/2017 |
| JP | 2019-064335 A | 4/2019 |
| JP | 2020-131880 A | 8/2020 |
| WO | WO-2009/106947 A1 | 9/2009 |
| WO | WO-2021/038266 A1 | 3/2021 |

* cited by examiner

*Primary Examiner* — Huan Le
(74) *Attorney, Agent, or Firm* — Foley & Lardner LLP

(57) ABSTRACT

A hybrid vehicle includes two drive sources and two clutches, and is switchable between a neutral mode and a parallel mode during vehicle traveling. The two drive sources are both disconnected from drive wheels in the neutral mode, and are both connected to the drive wheels in the parallel mode. A control method for the hybrid vehicle includes implementing at least one of a first switching control and a second switching control. The first switching control includes, upon switching from the neutral mode to the parallel mode, implementing two synchronization controls on rotational speeds before and after the two clutches, concurrently during at least a partial period. The second switching control includes, upon switching from the parallel mode to the neutral mode, implementing two controls to cause transmitted torques of the two clutches to respectively approach zero, concurrently during at least a partial period.

11 Claims, 10 Drawing Sheets

CONTROL METHOD AND CONTROL DEVICE FOR HYBRID VEHICLE

TECHNICAL FIELD

The present invention relates to a control method and a control device for a hybrid vehicle that includes a first drive source, a second drive source, and two clutches structured to perform connection and disconnection between the drive sources and drive wheels, and is structured to switch between a neutral mode and a parallel mode during vehicle traveling, wherein both of the first and second drive sources are disconnected from the drive wheels in the neutral mode and are connected to the drive wheels in the parallel mode.

BACKGROUND ART

Patent Document 1 discloses a series hybrid vehicle that includes a first clutch structured to perform connection and disconnection between drive wheels and an internal combustion engine connected to a generation motor, and includes a second clutch structured to perform connection and disconnection between the drive wheels and a travel motor. The series hybrid vehicle is structured to switch between a series hybrid mode and an engine direct-connection mode by switching of the two clutches. In each mode, one of the clutches is engaged while the other is disengaged. For example, switching from the engine direct-connection mode to the series hybrid mode is performed by steps of: executing a synchronization control on rotational speeds before and after the second clutch that has been in a disengaged state; engaging the second clutch in response to completion of the synchronization of the rotational speeds; causing a transmitted torque of the first clutch to approach zero by torque change-over between the two drive sources; and disengaging the first clutch. Thus, switching controls on the two clutches are implemented in sequence.

Such configuration of implementing the switching controls on the two clutches in sequence may deteriorate responsiveness to the mode switching.

PRIOR ART DOCUMENT(S)

Patent Document(s)

Patent Document 1: JP 2020-131880 A

SUMMARY OF THE INVENTION

One aspect of the present invention shows a control method and a control device for a hybrid vehicle including a first drive source, a second drive source, a first clutch, and a second clutch, wherein: the first clutch performs connection and disconnection between the first drive source and a first drive wheel; the second clutch performs connection and disconnection between the second drive source and the first drive wheel; the hybrid vehicle is structured to switch between a neutral mode and a parallel mode during vehicle traveling; and both of the first drive source and the second drive source are disconnected from the first drive wheel in the neutral mode, and are connected to the first drive wheel in the parallel mode. Each of the control method and the control device is configured to implement at least one of a first switching control and a second switching control. The first switching control includes, upon switching from the neutral mode to the parallel mode, implementing a synchronization control on rotational speeds before and after the first clutch and a synchronization control on rotational speeds before and after the second clutch, concurrently during at least a partial period. The second switching control includes, upon switching from the parallel mode to the neutral mode, implementing a control to cause a transmitted torque of the first clutch to approach zero and a control to cause a transmitted torque of the second clutch to approach zero, concurrently during at least a partial period.

Thus, the configuration to implement the switching controls of the two clutches concurrently during at least a partial period serves to improve responsiveness to mode switching.

MODE(S) FOR CARRYING OUT THE INVENTION

Figure 1:
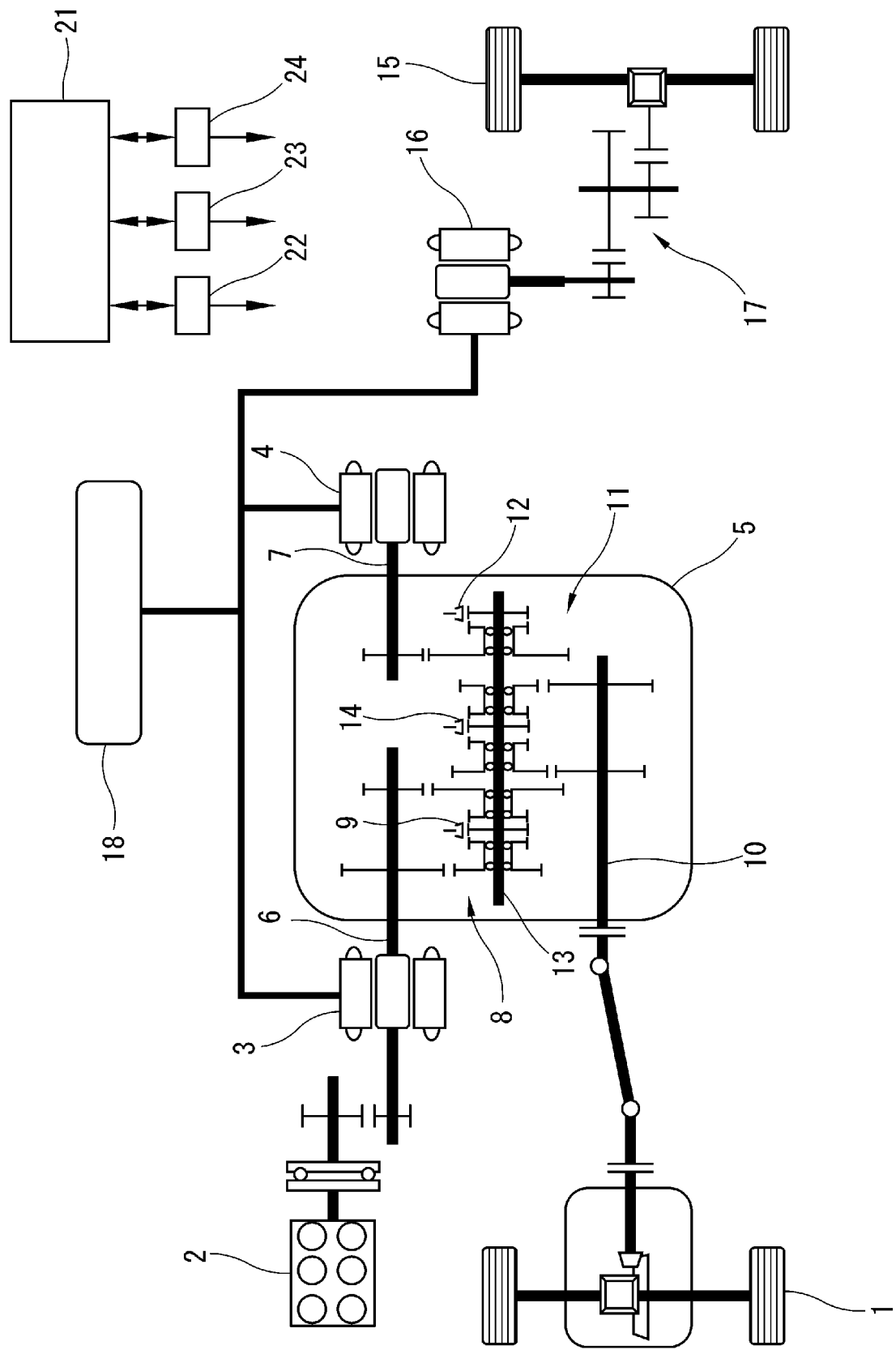
FIG. 1 is an illustrative view showing configurations of a power train of a hybrid vehicle according to an embodiment of the present invention.

The following details a first embodiment of the present invention with reference to the drawings. FIG. 1 is an illustrative view showing a configuration example of a power train of a hybrid vehicle to which the present invention is applied. According to the first embodiment, the present invention is applied to a four-wheel-drive hybrid vehicle including a motor structured to drive rear wheels and including two drive sources structured to drive front wheels. The hybrid vehicle is structured to select whether to travel by only the rear wheels or travel by the four wheels.

Specifically, the hybrid vehicle includes front wheels 1, a first drive source, and a second drive source, wherein the first and second drive sources drive front wheels 1. The first drive source includes an internal combustion engine 2 and a first motor generator 3 being in constant linkage with internal combustion engine 2. The second drive source includes a second motor generator 4. First motor generator 3 is a motor generator mainly for generation. Second motor generator 4 is a motor generator mainly for traveling. First motor generator 3 includes a rotational shaft serving as an output shaft of the first drive source and being directly connected to a first input shaft 6 of a transfer 5. Second motor generator 4 serving as the second drive source includes a rotational shaft directly connected to a second input shaft 7 of transfer 5.

Transfer 5 includes an output shaft 10 connected to front wheels 1. First input shaft 6 of transfer 5 transmits torque to output shaft 10 via a gear train 8 and a first clutch 9 disposed in gear train 8. Second input shaft 7 of transfer 5 transmits torque to output shaft 10 via a gear train 11 and a second clutch 12 disposed in gear train 11. Each of first clutch 9 and second clutch 12 is a dog clutch including a gear selector supported by an intermediate shaft 13, and, according to the first embodiment, further includes an actuator and a waiting spring mechanism structured to operate the gear selector. The drawing exemplarily shows that gear train 8 includes a pair of a high side gear and a low side gear different from each other in gear ratio, wherein first clutch 9 selectively engages with one of the high side gear and the low side gear. However, this selection between the high side and low side gears is not a main subject of the present invention. Thus, the following refers to engagement with any one of the high side and low side gears (e.g., engagement with the high side gear) as simply engagement.

Similarly, the drawing exemplarily shows that intermediate shaft 13 and output shaft 10 interpose therebetween a pair of a high side gear and a low side gear different from each other in gear ratio such that one of the high side and low side gears is selected by a third clutch 14 disposed on intermediate shaft 13. However, this selection between the high side and low side gears is not a main subject of the present invention. Thus, the following explanation is based on a premise that one of the high side and low side gears (e.g., the high side gear) is always selected.

First clutch 9 performs connection and disconnection between the first drive source (i.e., internal combustion engine 2 and first motor generator 3) and front wheels 1. Second clutch 12 performs connection and disconnection between the second drive source (i.e., second motor generator 4) and front wheels 1.

The drawing exemplarily shows that the hybrid vehicle includes a third motor generator 16 serving as a third drive source structured to drive rear wheels 15. Third motor generator 16 is in constant linkage with rear wheels 15 via a gear train 17.

First motor generator 3, second motor generator 4, and third motor generator 16 are connected to a battery 18 via an inverter not shown. The hybrid vehicle according to the present embodiment includes a power train controller 21 configured to control an entire of the power train in response to factors including a request from a driver. Power train controller 21 controls first motor generator 3, second motor generator 4, and third motor generator 16 via a motor controller 22. Furthermore, power train controller 21 controls internal combustion engine 2 via an engine controller 23, and controls first clutch 9, second clutch 12, and third clutch 14 in transfer 5 via a transmission controller 24.

Figure 2:
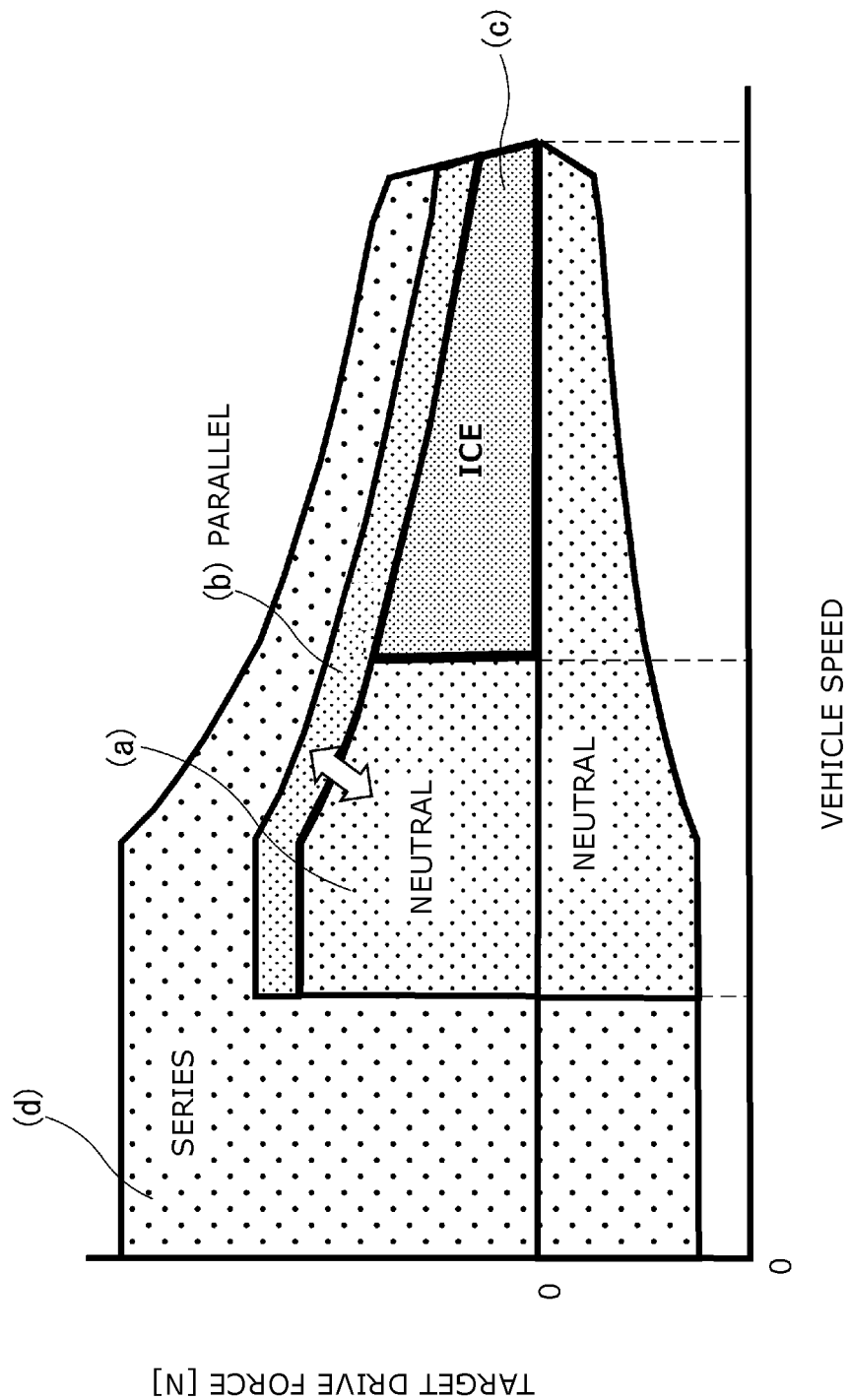
FIG. 2 is a characteristic chart showing operation regions of travel modes, with respect to vehicle speed and target drive force.

FIG. 2 is a characteristic chart showing regions of travel modes defined with vehicle speed (shown in a horizontal axis) and target drive force (shown in a vertical axis) employed as parameters. As shown in the drawing, the travel modes includes a neutral mode of region (a), a parallel mode of region (b), an ICE mode of region (c), and a series mode of region (d). The present embodiment is directed to control for switching between the neutral mode (a) and the parallel mode (b) greater in required drive force than the neutral mode (a).

The ICE mode (c) is a travel mode to travel with use of an output from internal combustion engine 2 and an output from third motor generator 16 linked to rear wheels 15. The series mode (d) is a travel mode to travel by driving second motor generator 4 and third motor generator 16 by generation in first motor generator 3.

Figure 3:
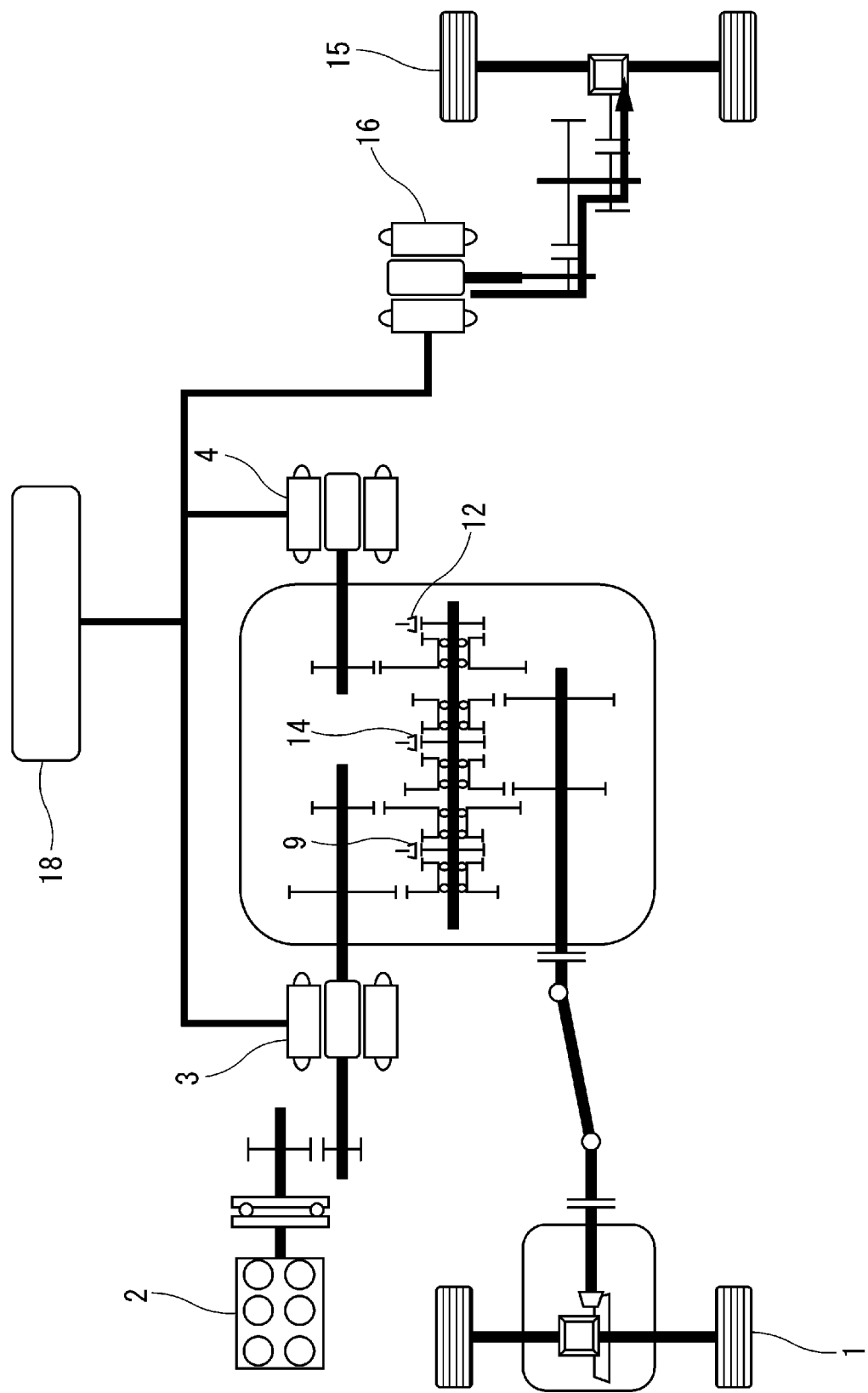
FIG. 3 is an illustrative view showing torque transmission paths in a neutral mode.

FIG. 3 is an illustrative view showing torque transmission paths in the neutral mode. In the neutral mode, each of first clutch 9 and second clutch 12 is in a disengaged state. Third clutch 14 is in engagement, for example, with the high side gear although third clutch 14 may be in engagement with any one of the high side and low side gears as described above. Thus, front wheels 1 are not driven. Rear wheels 15 are driven by third motor generator 16, and thereby the vehicle travels.

In addition, first motor generator 3 is driven by internal combustion engine 2, and generates electric power supplied to battery 18 and third motor generator 16.

Figure 4:
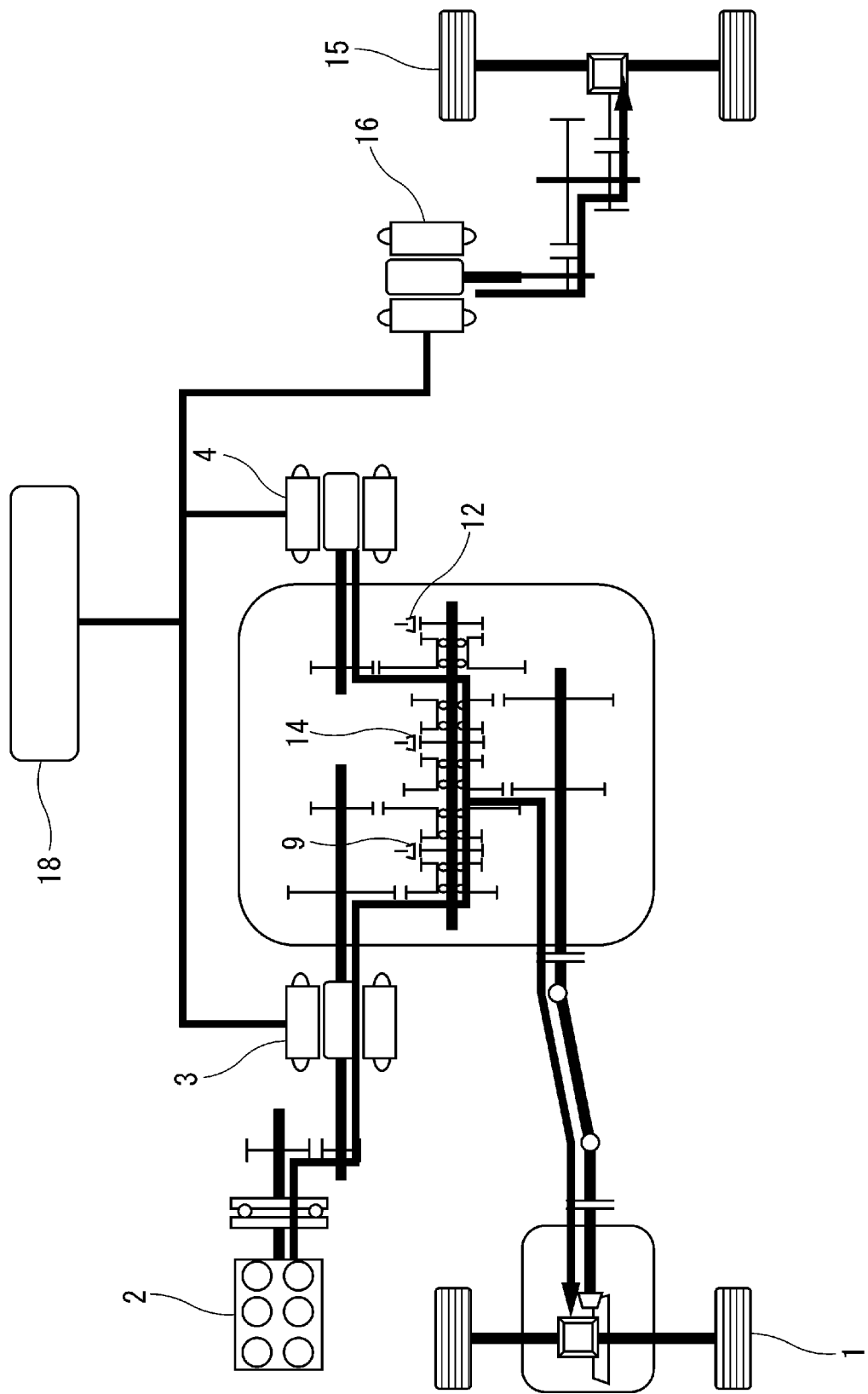
FIG. 4 is an illustrative view showing torque transmission paths in a parallel mode.

FIG. 4 is an illustrative view showing torque transmission paths in the parallel mode. In the parallel mode, each of first clutch 9 and second clutch 12 are in an engaged state, and third clutch 14 is in engagement with the high side gear for example. This causes front wheels 1 to be driven by both of the first drive source (i.e., internal combustion engine 2 and first motor generator 3) and the second drive source (i.e., second motor generator 4). Rear wheels 15 are driven by third motor generator 16. Thus, the vehicle travels by four-wheel-drive. First motor generator 3 of the first drive source is controlled to be in a regeneration state of a relatively low level such that the first drive source as an entire, including an output from internal combustion engine 2, generates a positive drive force.

As clarified in FIG. 2, the switching between the neutral mode and the parallel mode is performed during vehicle traveling in response to, for example, an increase or decrease in target drive force (i.e., required drive force). Such switching is desirably performed with high responsiveness. In particular, in case of switching from the neutral mode to the parallel mode in response to depression of an accelerator pedal by a driver, the vehicle is insufficient in acceleration responsiveness if the switching of the travel modes is not completed within a short time.

The switching from the neutral mode to the parallel mode involves switching of both of first clutch 9 and second clutch 12 from the disengaged state to the engaged state. Since first clutch 9 and second clutch 12 are the dog clutches, the switching of each clutch is performed by executing a control for synchronization of rotational speeds before and after the clutch and then operating the actuator in response to completion of the synchronization. The synchronization control on rotational speeds before and after first clutch 9 is performed with use of first motor generator 3. The synchronization control on rotational speeds before and after second clutch 12 is performed with use of second motor generator 4. In the present embodiment, the two synchronization controls are simultaneously started for improvement in responsiveness to the travel mode switching, as long as battery 18 is sufficient in electric power. In case of an insufficient electric power, the two synchronization controls are executed in sequence in order to suppress the electric power from being transitionally lowered due to overlapping of the two synchronization controls.

The switching from the parallel mode to the neutral mode involves switching of both of first clutch 9 and second clutch 12 from the engaged state to the disengaged state. The switching of the clutches is performed by causing transmitted torques of first clutch 9 and second clutch 12 to respectively approach zero. In case that each of first clutch 9 and second clutch 12 includes the waiting spring mechanism, each clutch is spontaneously disengaged in response to becoming approximately zero in transmitted torque, if the actuator has been switched to the disengagement side. The above control to cause the transmitted torque of first clutch 9 to approach zero is performed by first motor generator 3. The above control to cause the transmitted torque of second clutch 12 to approach zero is performed by second motor generator 4. In the present embodiment, these two controls are simultaneously started for improvement in responsiveness to the travel mode switching.

Figure 5:
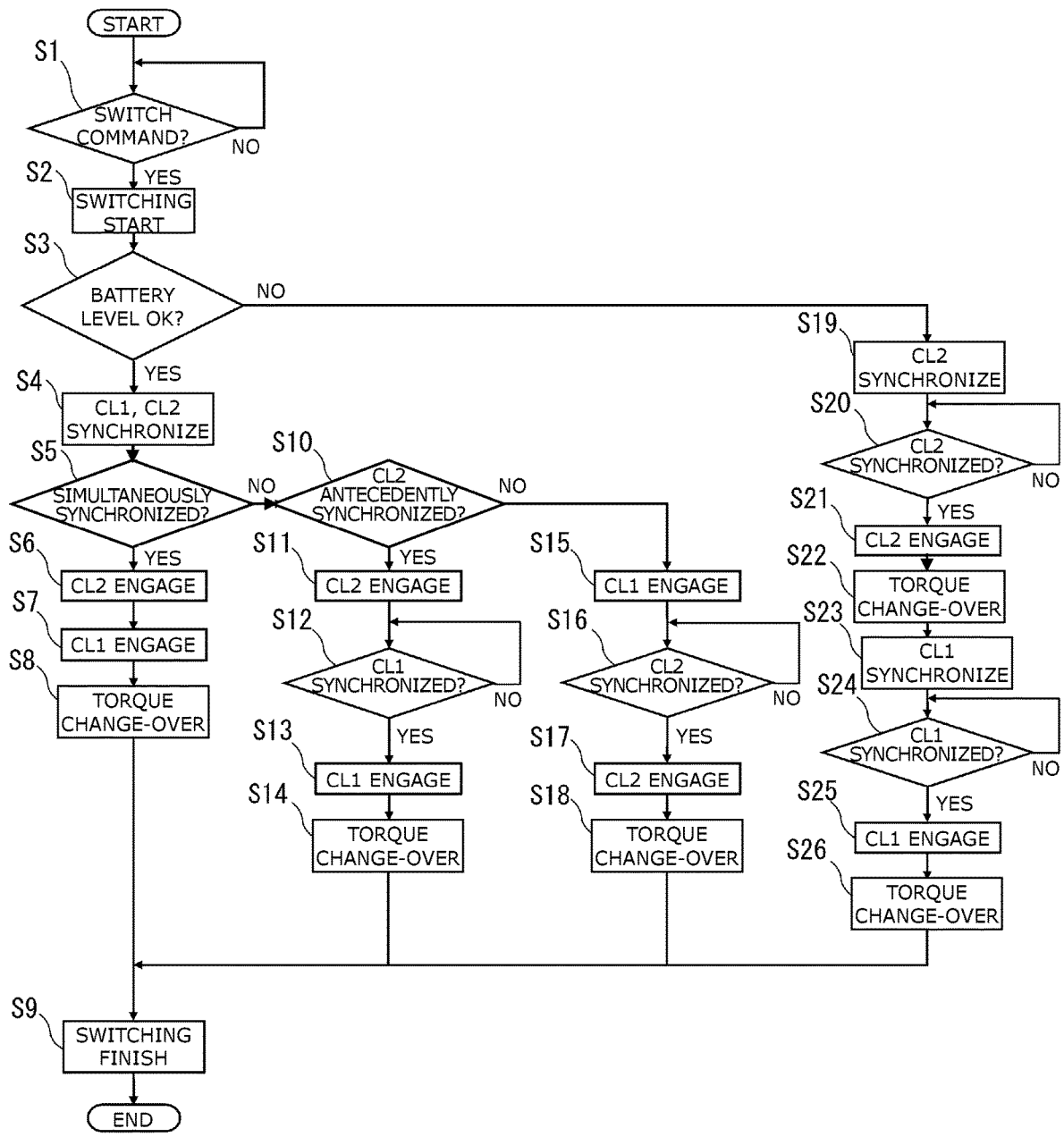
FIG. 5 is a flow chart of control for switching from the neutral mode to the parallel mode.

The following describes a control flow for the switching from the neutral mode to the parallel mode during vehicle traveling, with reference to a flow chart shown in FIG. 5.

Figure 7:
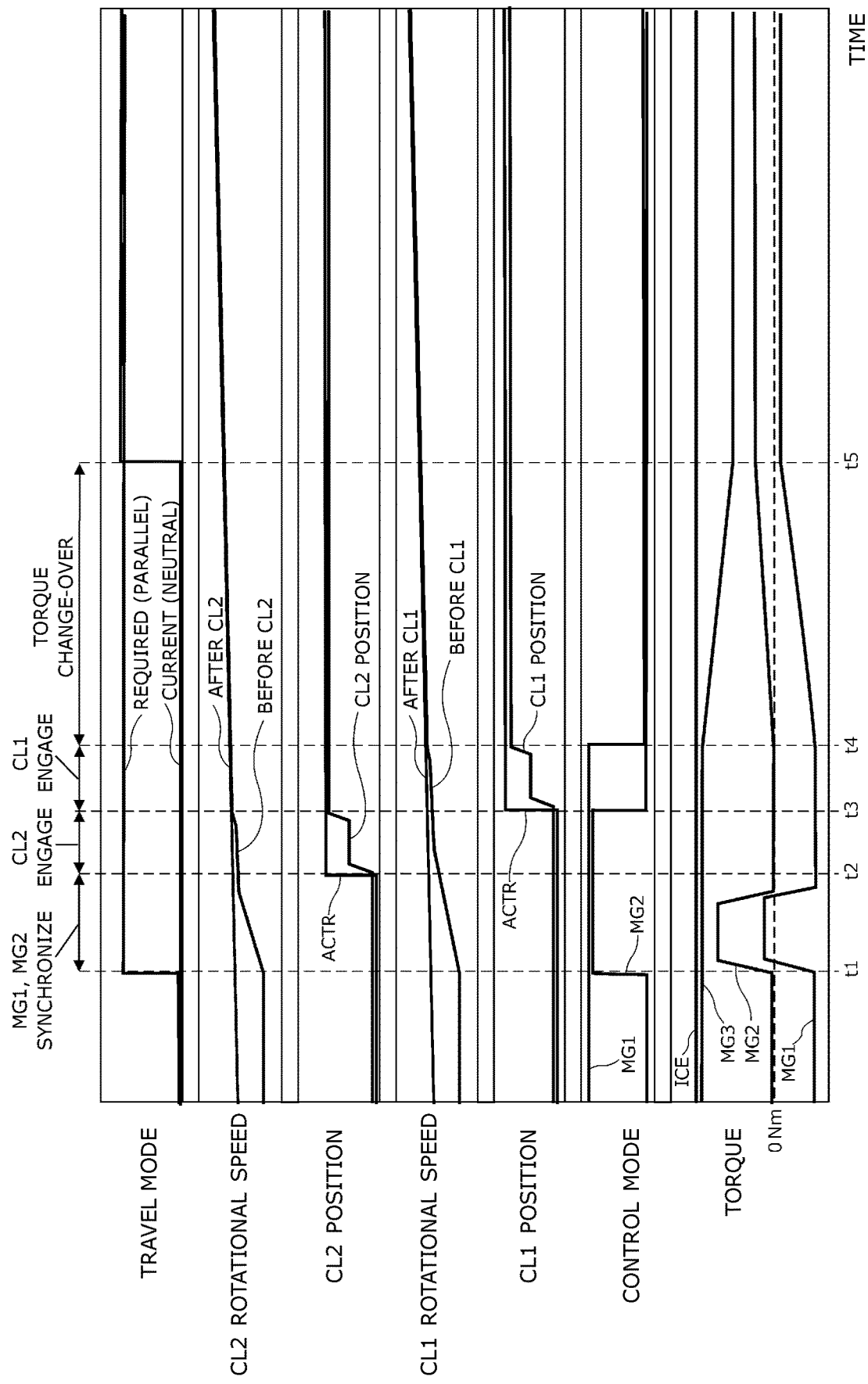
FIG. 7 is a time chart upon switching from the neutral mode to the parallel mode.

In the flow chart of FIG. 5 and a time chart of FIG. 7, first clutch 9 and second clutch 12 are respectively abbreviated to CL1 and CL2. First motor generator 3, second motor generator 4, and third motor generator 16 are respectively abbreviated to MG1, MG2, and MG3. Internal combustion engine 2 is abbreviated to ICE.

The switching to the parallel mode is started in response to a switch command to the parallel mode during vehicle traveling in the neutral mode (i.e., steps S1 and S2). First, step S3 is executed to determine whether battery 18 is sufficient in output electric power. If YES in step S3, step S4 is executed. If NO in step S3, step S19 is executed. The determination in step S3 is based on a criterion set to a value such as a half of an electric power required for concurrently performing the synchronization control on the rotational speeds before and after first clutch 9 and the synchronization control on the rotational speeds before and after second clutch 12.

In step S4, the synchronization control on the rotational speeds before and after first clutch 9 and the synchronization control on the rotational speeds before and after second clutch 12 are simultaneously started. As described above, these synchronization controls for first clutch 9 and second clutch 12 are performed respectively with use of first motor generator 3 and second motor generator 4. Subsequently, step S5 is executed to determine whether the synchronization at first clutch 9 and the synchronization at second clutch 12 have been simultaneously completed.

If the synchronization at first clutch 9 and the synchronization at second clutch 12 have been simultaneously completed, second clutch 12 is antecedently engaged, and first clutch 9 is subsequently engaged (i.e., steps S6 and S7). This configuration of antecedently engaging second clutch 12 serves to increase an amount of generation in first motor generator 3. A configuration of simultaneously engaging first clutch 9 and second clutch 12 enlarges a shock caused due to change in torque, and is unfavorable. Subsequently to completion of the engagement of first clutch 9 and second clutch 12, step S8 is executed to perform torque change-over among first motor generator 3, second motor generator 4, and third motor generator 16. Specifically, step S8 gradually changes torques of first motor generator 3, second motor generator 4, and third motor generator 16 in order to finally reach respective target torques for the parallel mode. In response to completion of the torque change-over, the series of mode-switching processes so far is finished (i.e., step S9).

If NO in step S5, step S10 is executed to determine whether the synchronization of the rotational speeds before and after second clutch 12 has been completed antecedently to first clutch 9. If YES in step S10, step S11 is executed to engage second clutch 12. Subsequently, step S12 is executed to wait for completion of the synchronization of the rotational speeds before and after first clutch 9. In response to completion of the synchronization at first clutch 9, step S13 is executed to engage first clutch 9. Subsequently, step S14 is executed to perform the torque change-over.

If NO in step S10, step S15 is executed to engage first clutch 9. Subsequently, step S16 is executed to wait for completion of the synchronization of the rotational speeds before and after second clutch 12. In response to completion of the synchronization at second clutch 12, step S17 is executed to engage second clutch 12. Subsequently, step S18 is executed to perform the torque change-over.

Thus, in case that one of the two synchronization controls having been simultaneously started is antecedently completed, the clutch of the completed one is antecedently engaged. This eliminates an unnecessary waiting time.

If determined insufficient in electric power in step S3, steps from S19 on are executed to perform the two synchronization controls in sequence. First, the synchronization control on the rotational speeds before and after second clutch 12 is started with use of second motor generator 4 (i.e., step S19). In response to completion of the synchronization at second clutch 12 (i.e., step S20), second clutch 12 is engaged (i.e., step S21), and then the torque change-over as needed is performed (i.e., step S22).

Thereafter, the synchronization control on the rotational speeds before and after first clutch 9 is started with use of first motor generator 3 (i.e., step S23). In response to completion of the synchronization at first clutch 9 (i.e., step S24), first clutch 9 is engaged (i.e., step S25), and then the torque change-over as needed is performed (i.e., step S26).

In case of implementing the two synchronization controls in sequence due to insufficiency in electric power, the synchronization and the engagement of second clutch 12 is implemented antecedently to those of first clutch 9. This serves to increase the amount of generation in first motor generator 3.

The time chart of FIG. 7 shows an example of the switching from the neutral mode to the parallel mode. This example corresponds to a case that the processes in the flow chart of FIG. 5 are executed in order of steps S1, S2, S3, S4, S5, S6, S7, S8, and S9: i.e., a case that the two synchronization controls are simultaneously started and simultaneously completed.

To enumerate in order from the top, FIG. 7 shows sections of: the travel modes; the rotational speeds before and after second clutch 12; a position (i.e., engaged or disengaged) of second clutch 12; the rotational speeds before and after first clutch 9; a position (i.e., engaged or disengaged) of first clutch 9; control modes (i.e., rotational speed control or torque control) of first motor generator 3 and second motor generator 4; and torques of internal combustion engine 2, first motor generator 3, second motor generator 4, and third motor generator 16. The section of the travel modes shows a current travel mode and a required travel mode, where a lower side in the section corresponds to the neutral mode, while an upper side in the section corresponds to the parallel mode. Each of the section of the position of first clutch 9 and the section of the position of second clutch 12 shows a position of the actuator and an actual position of the gear selector, where a lower side in the section corresponds to the disengaged position, while an upper side in the section corresponds to the engaged position. In the section of the control modes of first motor generator 3 and second motor generator 4, a lower side in the section corresponds to the torque control, while an upper side in the section corresponds to the rotational speed control. In the section of the torques, a lower field below zero corresponds to regeneration, while an upper field above zero corresponds to powering.

In the example of FIG. 7, the switching from the neutral mode to the parallel mode is commanded at a time instant t1.

Simultaneously, the synchronization control on the rotational speeds before and after first clutch 9 with use of first motor generator 3 and the synchronization control on the rotational speeds before and after second clutch 12 with use of second motor generator 4 are started. Each of first motor generator 3 and second motor generator 4 is under the rotational speed control.

At a time instant t2, the synchronization at first clutch 9 and the synchronization at second clutch 12 are simultaneously completed. In response to this, second clutch 12 is engaged antecedently to first clutch 9 as described above. After completion of the engagement of second clutch 12, first clutch 9 is engaged at a time instant t3. After completion of the engagement of first clutch 9, the torque change-over as required among first motor generator 3, second motor generator 4, and third motor generator 16 is performed during a period from a time instant t4 until a time instant t5. In the neutral mode before the switching, the vehicle travels by driving the rear wheels 15 with third motor generator 16. In the parallel mode after the switching, the vehicle travels by driving the front wheels 1 with the first drive source (i.e., internal combustion engine 2 and first motor generator 3) and the second drive source (i.e., second motor generator 4) in addition to the driving of rear wheels 15 with third motor generator 16.

This configuration of simultaneously and concurrently implementing the two synchronization controls serves to improve the responsiveness to the travel mode switching: in particular, improve acceleration responsiveness of the vehicle to the switching from the neutral mode to the parallel mode due to an increase in target drive force of the vehicle.

In the example of FIG. 7, first motor generator 3 is in a powering state during a period from time instant t1 until time instant t2 during which the synchronization controls are executed. However, first motor generator 3 may possibly be in a regeneration state during this period depending on some conditions.

Figure 6:
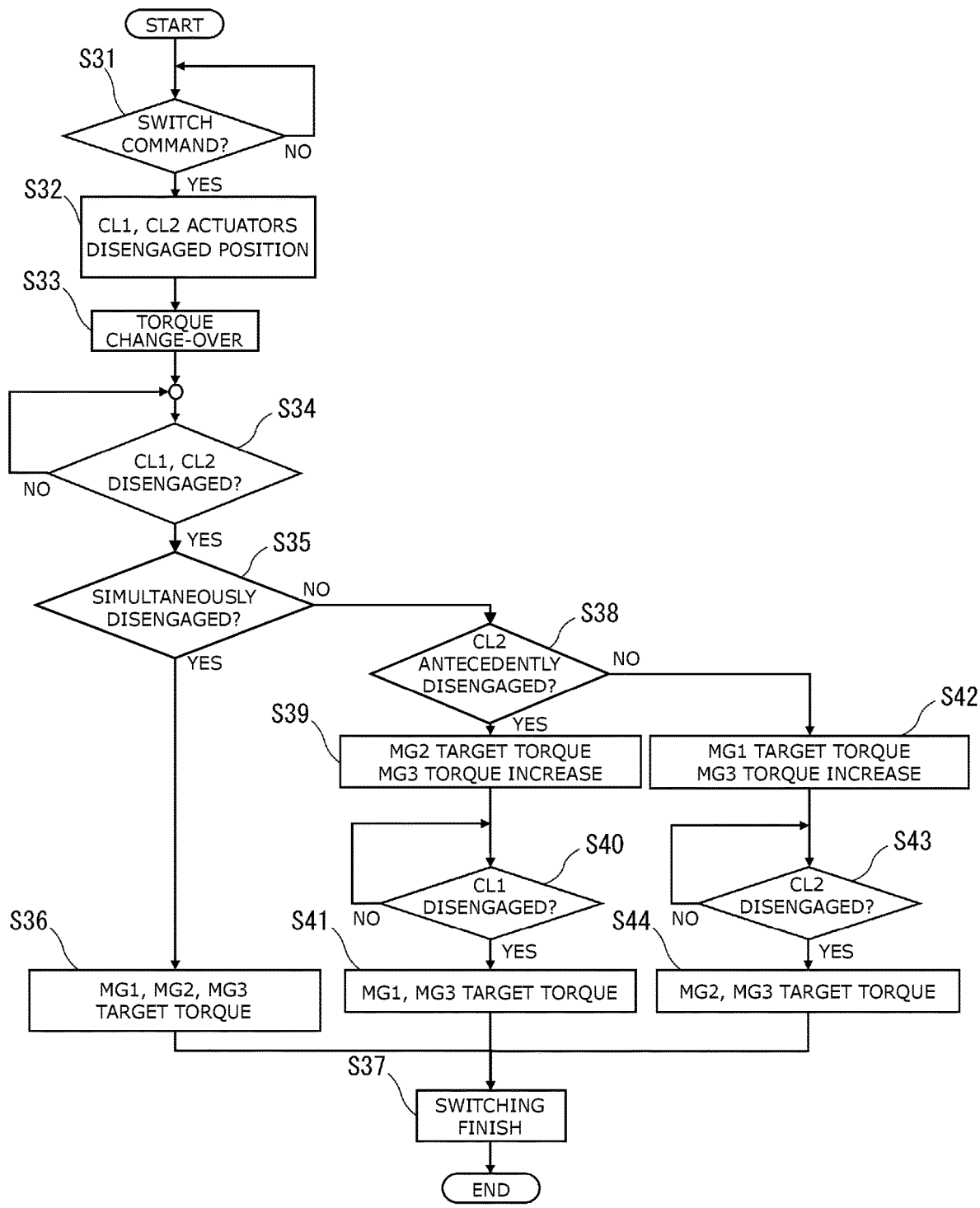
FIG. 6 is a flow chart of control for switching the parallel mode to the neutral mode.

The following describes a control flow for the switching from the parallel mode to the neutral mode during vehicle traveling, with reference to a flow chart shown in FIG. 6. In response to a switch command to the neutral mode during vehicle traveling in the parallel mode (i.e., step S31), the actuators of first clutch 9 and second clutch 12 are simultaneously shifted to the respective disengaged positions (i.e., step S32). Since each of first clutch 9 and second clutch 12 includes the waiting spring mechanism as described above, the gear selectors do not actually shift despite the shifting of the actuators, as long as transmitted torques are exerted on the clutches. In response to satisfaction of a condition that the transmitted torques respectively become approximately zero, the gear selectors spontaneously shift, and thereby first clutch 9 and second clutch 12 are disengaged.

Thereafter, step S33 is executed to start the torque change-over: specifically, to gradually reduce a torque of the first drive source (i.e., internal combustion engine 2 and first motor generator 3) in order to bring the transmitted torque of first clutch 9 to approximately zero, and similarly, to gradually reduce a torque of the second drive source (i.e., second motor generator 4) in order to bring the transmitted torque of second clutch 12 to approximately zero. In addition, the torque of third motor generator 16 is gradually increased in order to maintain a drive force as an entire of the vehicle.

In parallel with these processes where the transmitted torques of first clutch 9 and second clutch 12 respectively approach zero, step S34 is executed to determine whether each of first clutch 9 and second clutch 12 has been actually disengaged. The disengagement of each clutch may be detected by monitoring the position of the gear selector of the dog clutch with use of a sensor, or may be detected with reference to change in torque etc.

Subsequent step S35 is determination of whether first clutch 9 and second clutch 12 have been disengaged simultaneously with each other. If disengaged simultaneously, the torques of first motor generator 3, second motor generator 4, and third motor generator 16 are instantly set to respective target torques (i.e., step S36). Specifically, after the switching to the neutral mode, the target torque of first motor generator 3 is a negative value for generation, and the target torque of second motor generator 4 is zero, and the target torque of third motor generator 16 is a positive value required for vehicle traveling. In response to satisfaction of a condition that the torques of the motor generators reach the respective target torques, the series of mode-switching processes so far is finished (i.e., step S37).

In case of NO in step S35 and YES in step S38, i.e., in case that second clutch 12 has been disengaged antecedently to first clutch 9, step S39 is executed to instantly set the torque of second motor generator 4 to the target torque (i.e., zero), and increase the torque of third motor generator 16 so as to form a torque step and thereby cancel a torque step caused due to the disengagement of second clutch 12.

Thereafter, step S40 is executed to wait for the disengagement of first clutch 9. In response to the disengagement of first clutch 9, step S41 is executed to set the torques of first motor generator 3 and third motor generator 16 to the respective target torques described above. In response to satisfaction of the condition that the torques of the motor generators reach the respective target torques, the series of mode-switching processes so far is finished (i.e., step S37).

In case of NO in step S35 and NO in step S38, i.e., in case that first clutch 9 has been disengaged antecedently to second clutch 12, step S42 is executed to instantly set the torque of first motor generator 3 to the target torque (i.e., a negative value for generation), and increase the torque of third motor generator 16 so as to form a torque step and thereby cancel a torque step caused due to the disengagement of first clutch 9.

Thereafter, step S43 is executed to wait for the disengagement of second clutch 12. In response to the disengagement of second clutch 12, step S44 is executed to set the torques of second motor generator 4 and third motor generator 16 to the respective target torques described above. In response to satisfaction of the condition that the torques of the motor generators reach the respective target torques, the series of mode-switching processes so far is finished (i.e., step S37).

Figure 8:
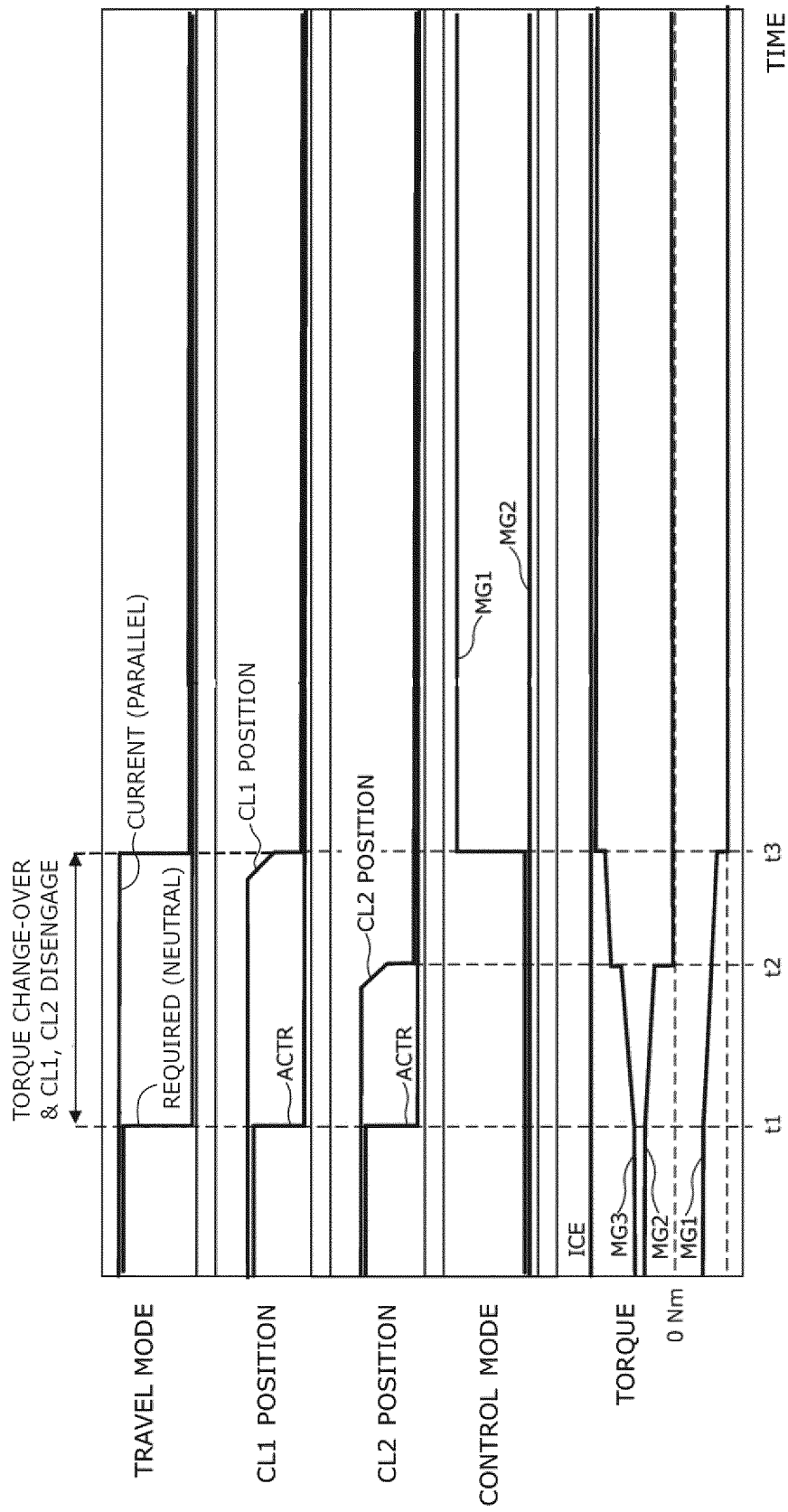
FIG. 8 is a time chart upon switching from the parallel mode to the neutral mode.

The time chart of FIG. 8 shows an example of the switching from the parallel mode to the neutral mode. This example corresponds to a case that the processes in the flow chart of FIG. 6 are executed in order of steps S31, S32, S33, S34, S35, S38, S39, S40, S41, and S37: i.e., a case that second clutch 12 is disengaged antecedently to first clutch 9.

In the example of FIG. 8, the switching from the parallel mode to the neutral mode is commanded at a time instant t1, and the actuators of first clutch 9 and second clutch 12 are switched to the disengagement side. Simultaneously, the control to cause the transmitted torque of first clutch 9 to approach zero with use of first motor generator 3 and the control to cause the transmitted torque of second clutch 12 to approach zero with use of second motor generator 4 are started. Third motor generator 16 is gradually increased in torque in order to maintain the drive force as the entire of the vehicle. Each of first motor generator 3 and second motor generator 4 is under the torque control.

At a time instant t2, second clutch 12 is disengaged antecedently to first clutch 9, and the torque of second motor generator 4 falls to zero. Simultaneously, for canceling a torque step thereof, the torque of third motor generator 16 is increased so as to form a torque step.

Thereafter, at a time instant t3, first clutch 9 is disengaged, and the torque of first motor generator 3 reaches a negative value being the target torque. Simultaneously, for canceling a torque step thereof also this time, the torque of third motor generator 16 of first motor generator 3 is increased so as to form a torque step. Thus, the mode switching is completed at time instant t3.

Thus, the control to cause the transmitted torque of first clutch 9 to approach zero and the control to cause the transmitted torque of second clutch 12 to approach zero are simultaneously started, and are implemented in parallel during at least a partial period. This serves to improve responsiveness to the travel mode switching from the parallel mode to the neutral mode.

Next, the following describes a second embodiment in which neither of first clutch 9 and second clutch 12 includes a waiting spring mechanism. The second embodiment exemplifies a control flow for switching from the parallel mode to the neutral mode with reference to a flow chart of FIG. 9 and a time chart of FIG. 10.

Figure 9:
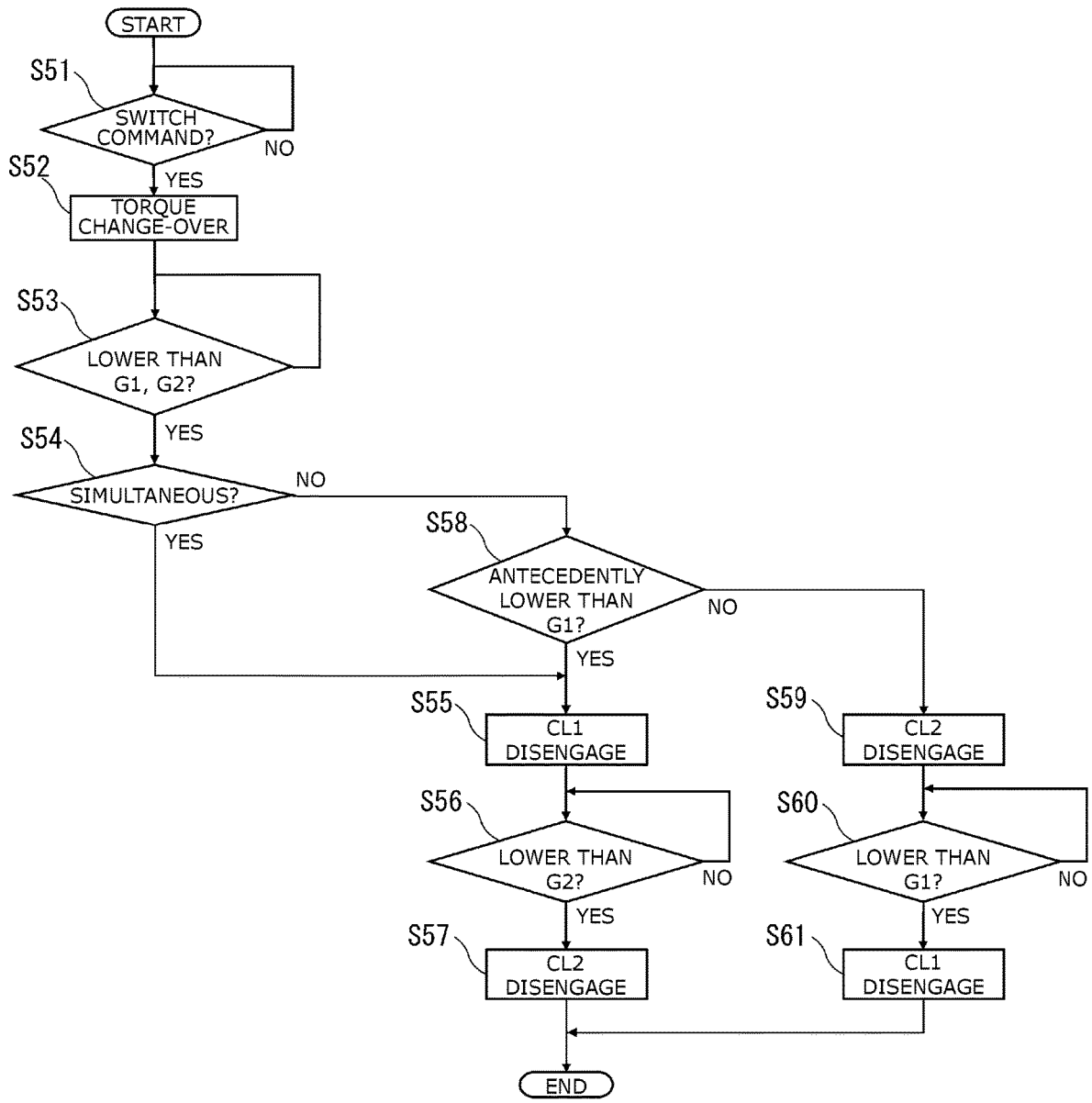
FIG. 9 is a flow chart of control for switching from the parallel mode to the neutral mode, in case of omitting a waiting spring mechanism.

As shown in the flow chart of FIG. 9, in response to a switch command to the neutral mode during vehicle traveling in the parallel mode (i.e., step S51), step S52 is executed to start the torque change-over: specifically, to gradually reduce the torque of the first drive source (i.e., internal combustion engine 2 and first motor generator 3) so as to cause the transmitted torque of first clutch 9 to approach zero, and similarly, to gradually reduce the torque of the second drive source (i.e., second motor generator 4) so as to cause the transmitted torque of second clutch 12 to approach zero. The torque of third motor generator 16 is gradually increased in order to maintain the drive force as the entire of the vehicle.

In parallel with these processes where the transmitted torques of first clutch 9 and second clutch 12 respectively approach zero, step S53 is executed to determine whether the transmitted torques of first clutch 9 and second clutch 12 have respectively become lower than predetermined torques G1 and G2 that are respectively set for first clutch 9 and second clutch 12. Each of predetermined torques G1 and G2 is set to a level for suppressing an vehicle acceleration (G) due to the clutch disengagement from giving an uncomfortable feeling to an occupant.

Subsequent step S54 is determination of whether the transmitted torques of first clutch 9 and second clutch 12 have become lower than the respective predetermined torques G1 and G2 simultaneously with each other. If having become lower than the predetermined torques simultaneously, step S55 is executed to shift the actuator of first clutch 9 to the disengaged position. Subsequently, step S56 is executed to confirm that the transmitted torque of second clutch 12 is lower than predetermined torque G2. Then, step S57 is executed to shift the actuator of second clutch 12 to the disengaged position.

Since neither of first clutch 9 and second clutch 12 includes a waiting spring mechanism, the shifting of the actuators causes the gear selectors to shift, and thereby causes first clutch 9 and second clutch 12 to be disengaged. At a timing of the disengagement, the transmitted torques of first clutch 9 and second clutch 12 are already sufficiently low. This reduces a shock to the vehicle. In addition, the configuration of antecedently disengaging first clutch 9 serves to increase an amount of generation in first motor generator 3.

If NO in step S54 and YES in step S58, i.e., if the transmitted torque of first clutch 9 has become lower than predetermined torque G1 antecedently, step S55 is executed similarly to the above to shift the actuator of first clutch 9 to the disengaged position. Subsequently, step S56 is executed to wait for the transmitted torque of second clutch 12 to become lower than predetermined torque G2. In response to becoming lower than predetermined torque G2, step S57 is executed to shift the actuator of second clutch 12 to the disengaged position.

If NO in step S54 and NO in step S58, i.e., if the transmitted torque of second clutch 12 has become lower than predetermined torque G2 antecedently, step S59 is executed to shift the actuator of second clutch 12 to the disengaged position. Thereafter, step S60 is executed to wait for the transmitted torque of first clutch 9 to become lower than predetermined torque G1. In response to becoming lower than predetermined torque G1, step S61 is executed to shift the actuator of first clutch 9 to the disengaged position.

Figure 10:
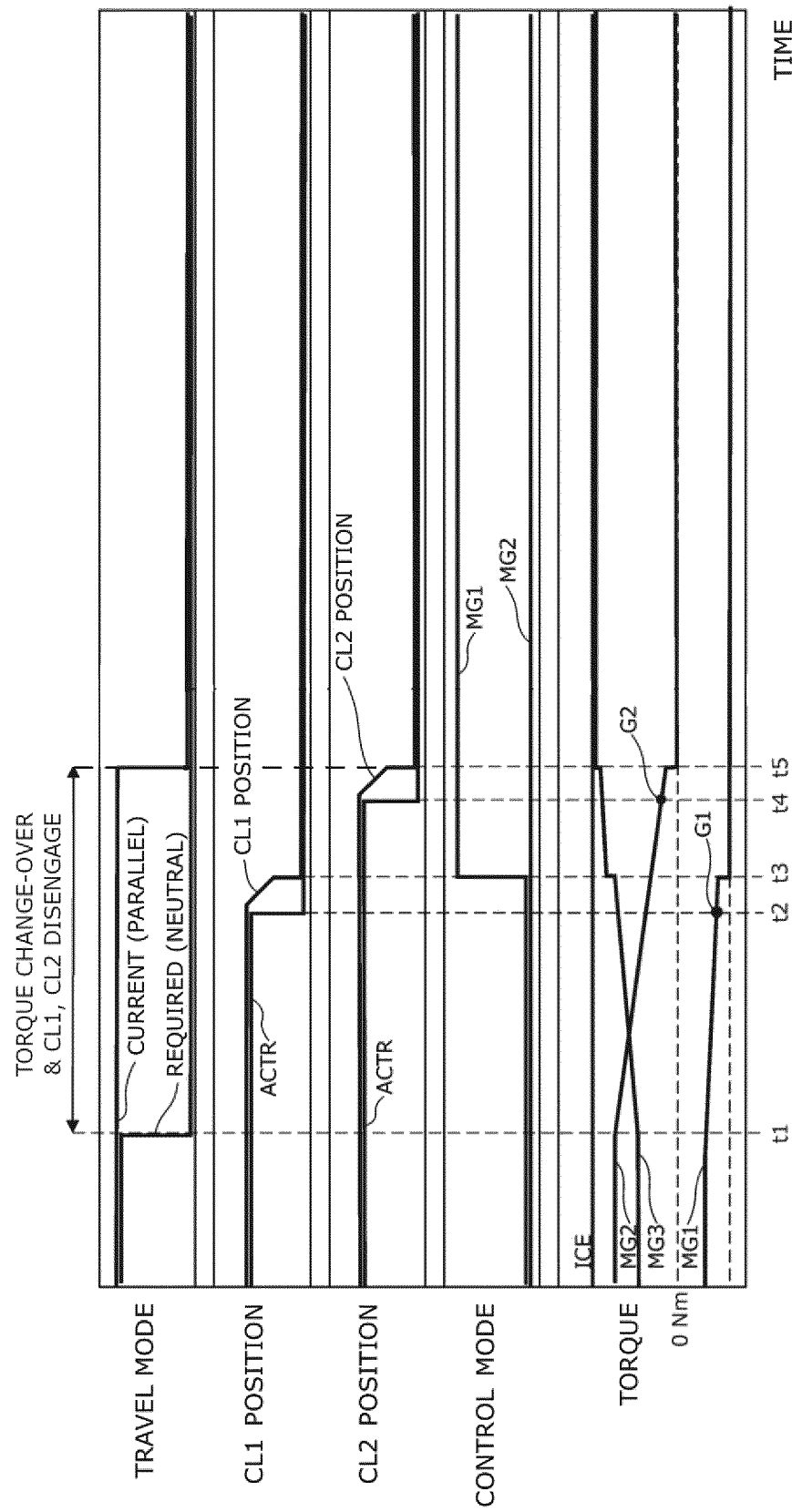
FIG. 10 is a time chart upon switching from the parallel mode to the neutral mode, in case of omitting a waiting spring mechanism.

The time chart of FIG. 10 shows an example of a case that the transmitted torque of first clutch 9 antecedently becomes lower than the predetermined torque. This example corresponds to a case that the processes in the flow chart of FIG. 9 are executed in order of steps S51, S52, S53, S54, S58, S55, S56, and S57.

In the example of FIG. 10, the switching from the parallel mode to the neutral mode is commanded at a time instant t1. Simultaneously, the control to cause the transmitted torque of first clutch 9 to approach zero with use of first motor generator 3 and the control to cause the transmitted torque of second clutch 12 to approach zero with use of second motor generator 4 are started. Third motor generator 16 is gradually increased in torque in order to maintain the drive force as the entire of the vehicle. Each of first motor generator 3 and second motor generator 4 is under the torque control.

At a time instant t2, the transmitted torque of first clutch 9 becomes lower than predetermined torque G1, and the actuator of first clutch 9 is shifted to the disengaged position. At a time instant t3, the disengagement of first clutch 9 is detected, and the torque of first motor generator 3 falls to a negative value being the target torque. Simultaneously, in the example of the drawing, the torque of third motor generator 16 is increased so as to form a torque step and thereby cancel a torque step caused in the torque of first motor generator 3.

Thereafter, at a time instant t4, the transmitted torque of second clutch 12 becomes lower than predetermined torque G2, and the actuator of second clutch 12 is shifted to the disengaged position. At a time instant t5, the disengagement of second clutch 12 is detected, and the torque of second motor generator 4 falls to zero being the target torque. Simultaneously, in the example of the drawing, the torque of third motor generator 16 is increased so as to form a torque step and thereby cancel a torque step caused in the torque of second motor generator 4. Thus, the mode switching is completed at time instant t5.

Thus, the control to cause the transmitted torque of first clutch 9 to approach zero and the control to cause the transmitted torque of second clutch 12 to approach zero are simultaneously started, and are executed in parallel during at least a partial period. This serves to improve responsiveness to the travel mode switching from the parallel mode to the neutral mode.

The present invention is not limited to the embodiments detailed above, but may be variously modified. For example, while the above embodiments exemplify the four-wheel-drive vehicle including rear wheels 15 driven by third motor generator 16, the switching between the neutral mode and the parallel mode as described above may be applied to a case of coast traveling in the neutral mode. Thus, the present invention is not limited to a four-wheel-drive vehicle.

The invention claimed is:

1. A control method for a hybrid vehicle including a first drive source, a second drive source, a first clutch, and a second clutch, wherein: the first drive source includes a first motor generator; the second drive source includes a second motor generator; the first clutch performs connection and disconnection between the first drive source and a first drive wheel; the second clutch performs connection and disconnection between the second drive source and the first drive wheel; the hybrid vehicle is structured to switch between a neutral mode and a parallel mode during vehicle traveling; and both of the first drive source and the second drive source are disconnected from the first drive wheel in the neutral mode, and are connected to the first drive wheel in the parallel mode, the control method comprising:
   implementing at least one of a first switching control and a second switching control, wherein:
   the first switching control includes, upon switching from the neutral mode to the parallel mode, implementing a synchronization control on rotational speeds before and after the first clutch by control on the first motor generator and a synchronization control on rotational speeds before and after the second clutch by control on the second motor generator, concurrently during at least a partial period; and
   the second switching control includes, upon switching from the parallel mode to the neutral mode, implementing a control to cause a transmitted torque of the first clutch to approach zero by control on the first motor generator and a control to cause a transmitted torque of the second clutch to approach zero by control on the second motor generator, concurrently during at least a partial period.

2. The control method as claimed in claim 1, wherein the synchronization control for the first clutch and the synchronization control for the second clutch are implemented concurrently during at least a partial period in case of a first battery electric power greater than a predetermined level, and are implemented in sequence in case of a second battery electric power less than the predetermined level.

3. The control method as claimed in claim 2, wherein in case of implementing the synchronization control for the first clutch and the synchronization control for the second clutch in sequence due to the second battery electric power, the synchronization control and engagement of the second clutch are implemented antecedently to those of the first clutch.

4. The control method as claimed in claim 1, wherein in case of implementing the synchronization control for the first clutch and the synchronization control for the second clutch concurrently during at least a partial period, one of the two clutches is engaged antecedently to the other of the two clutches if the synchronization control for the one of the two clutches has been completed antecedently to the synchronization control for the other of the two clutches.

5. The control method as claimed in claim 4, wherein in case that the synchronization control for the first clutch and the synchronization control for the second clutch have been simultaneously completed, the second clutch is engaged antecedently to the first clutch.

6. The control method as claimed in claim 1, wherein in the second switching control, the control to cause the transmitted torque of the first clutch to approach zero and the control to cause the transmitted torque of the second clutch to approach zero are started simultaneously.

7. The control method as claimed in claim 6, wherein:
   each of the first clutch and the second clutch includes an actuator and a waiting spring mechanism; and
   each of the actuators is shifted to a disengagement side simultaneously with a start of the control to cause the transmitted torque of the first clutch to approach zero and the control to cause the transmitted torque of the second clutch to approach zero.

8. The control method as claimed in claim 7, wherein:
   the hybrid vehicle further includes a third motor generator structured to drive a second drive wheel; and
   the third motor generator is increased stepwise in torque in response to disengagement of the first clutch and in response to disengagement of the second clutch, so as to cancel torque steps caused due to the disengagement of the first clutch and the disengagement of the second clutch.

9. The control method as claimed in claim 6, wherein:
   each of the first clutch and the second clutch includes an actuator, and neither of the first clutch and the second clutch includes a waiting spring mechanism; and
   each of the first clutch and the second clutch is disengaged in response to satisfaction of a condition that the transmitted torque of the each of the first clutch and the second clutch becomes lower than a predetermined torque set for the each of the first clutch and the second clutch.

10. The control method as claimed in claim 9, wherein in case that the transmitted torque of the first clutch and the transmitted torque of the second clutch simultaneously becomes lower than the respective predetermined torques, the first clutch is disengaged antecedently to the second clutch.

11. A control device for a hybrid vehicle including a first drive source, a second drive source, a first clutch, and a second clutch, wherein: the first drive source includes a first motor generator; the second drive source includes a second motor generator; the first clutch performs connection and disconnection between the first drive source and a first drive wheel; the second clutch performs connection and disconnection between the second drive source and the first drive wheel; the hybrid vehicle is structured to switch between a neutral mode and a parallel mode during vehicle traveling; and both of the first drive source and the second drive source are disconnected from the first drive wheel in the neutral mode, and are connected to the first drive wheel in the parallel mode, the control device comprising:
   a section configured to implement at least one of a first switching control and a second switching control, wherein:
   the first switching control includes, upon switching from the neutral mode to the parallel mode, implementing a synchronization control on rotational speeds before and after the first clutch by control on the first motor generator and a synchronization control on rotational speeds before and after the second clutch by control on the second motor generator, concurrently during at least a partial period; and the second switching control includes, upon switching from the parallel mode to the neutral mode, implementing a control to cause a transmitted torque of the first clutch to approach zero by control on the first motor generator and a control to cause a transmitted torque of the second clutch to approach zero by control on the second motor generator, concurrently during at least a partial period.

* * * * *